United States Patent Office 3,723,371
Patented Mar. 27, 1973

3,723,371
HOT MELT ADHESIVE HAVING IMPROVED
CREEP PROPERTIES
Robert H. Campbell, Brookhaven, and Wesley R. Cherry,
Prospect Park, Pa., assignors to Sun Oil Company of
Pennsylvania, Philadelphia, Pa.
No Drawing. Continuation of abandoned application Ser.
No. 539,298, Apr. 1, 1966. This application Dec. 10,
1970, Ser. No. 97,051
Int. Cl. C08f 45/52; C08g 51/52
U.S. Cl. 260—28.5 AN          12 Claims

ABSTRACT OF THE DISCLOSURE

The creep properties of a hot melt adhesive containing 35 to 65 parts by weight of an ethylene-vinyl acetate copolymer which contains 17 to 30 weight percent vinyl acetate and 30 to 45 parts by weight of an aromatic hydrocarbon-aldehyde resin having a ring and ball softening point in the range of 70 to 150° C. can be improved by adding to this composition 10 to 25 parts by weight of a crystalline wax having a melting point of at least 150° F.

---

This application is a continuation of Ser. No. 539,298, filed Apr. 1, 1966, now abandoned.

This invention relates to hot melt adhesive compositions. In particular, it relates to hot melt adhesive compositions produced from low-cost materials, having excellent creep properties and the method of obtaining the improved creep properties.

Hot melt adhesives produce a bond by mere cooling as distinguished from cross-linking or other chemical reactions. Prior to heating, the hot melt adhesives are solids that can be prepared in bulk or pellet form for ease of handling. Upon heating, the hot melt adhesive composition melts and flows freely for application to a substrate. Since the hot melt adhesives of the present invention are thermoplastic rather than thermosetting, and thus remeltable, they can be applied to a substrate at one time and later remelted to form a hot melt bond with another substrate.

Hot melts are useful adhesives for bonding wood, paper, plastics, textiles and other materials. One use for which they are well suited is the fabrication of corrugated paper board. Hot melts used for producing corrugated paper board must have high bond strength under conditions of shock stress, high humidity and extremes of temperature encountered in transportation and storage. In addition, the melt point, wetting time, initial tack, setting time, pot life and general handling qualities on automatic corrugated board machinery are essential considerations.

It has been found in commonly assigned U.S. Pat. 3,419,641 that a high performance, low-cost, hot melt adhesive can be obtained by blending a hydrocarbon-aldehyde (formolite) resin with a copolymer of ethylene and vinyl acetate.

These compositions have been found to have excellent properties for use in bonding materials, particularly paper. It has been found that in corrugated paper board machinery which has been modified for hot melt adhesive use that these compositions were superior to scores of other hot melt compositions as to performance in the corrugating machinery and in the corrugated paper board produced.

Standard tests of double facer corrugated paper board prepared from formolite resin and ethylene-vinyl acetate copolymer compositions and comparison runs with double facer board prepared from conventional starch-based adhesive and expensive starch-resorcinol adhesive showed the corrugated paper board produced from the novel hot melt adhesives to be superior to or equivalent to the conventional starch and resorcinol starch boards in nearly all properties. The hot melt adhesive corrugated paper board overall is considered to be more desirable and useful than the other paper boards.

The hot melt corrugated paper board prepared from formolite resin and ethylene-vinyl acetate copolymer compositions was found to be deficient in regard to its creep property. The creep may be defined as the tendency of the corrugated medium and the facer sheets to move parallel to the plane of the bond when a shearing force is applied to the bond.

The bond when tested for creep according to the process set forth herein preferably has less than 5% creep in 24 hours at 25 pounds per square inch and 140° F. It was found that hot melt compositions which are blends of only formolite resin and an ethylene-vinyl acetate copolymer melted under these conditions.

It is an object of the present invention to produce hot melt adhesive compositions having all of the desirable features and properties of the formolite resin and ethylene-vinyl acetate copolymer blends but with creep characteristics that will make such blends entirely satisfactory for the production all-purpose commercial corrugated paper board.

It is a further object of the present invention to devise a method of improving the creep characteristics of hot melt adhesives.

It is a still further object of the present invention to produce novel hot melt adhesive compositions.

The objects of the present invention, wherein the creep properties are improved, are achieved by blending in a homogeneous mixture comprising 25–65 parts by weight ethylene-vinyl acetate copolymer, 30–65 parts by weight aromatic hydrocarbon-aldehyde resin and 5–30 parts by weight of a crystalline high melting wax. Preferably the compositions of the present invention comprise 35 to 60 parts by weight ethylene-vinyl acetate copolymer, 30 to 45 parts by weight aromatic hydrocarbon-aldehyde resin and 10 to 25 parts by weight of a crystalline high melting wax.

The preparation of ethylene-vinyl acetate copolymer is known in the art. Preparations are shown in U.S. Pat. No. 2,200,429 to Perrin et al. and Canadian Pat. No. 657,977 to Strauss dated Jan. 29, 1963. Generally, the preparation involves copolymerizing a mixture of ethylene and vinyl acetate by means of a free-radical producing catalyst, such as oxygen, or an organic peroxide, at a pressure of 100 to 200 atmospheres and a temperature in the range of 150° C. to 250° C. and recovering the product. The proportion of vinyl acetate in the resin does not appear to be important in the instant compositions. Copolymers containing 17 to 35 wt. percent vinyl acetate are suitable for use in the compositions having improved creep properties; however, improved compositions employ ethylene-vinyl acetate copolymers having 17 to 30 wt. percent vinyl acetate. The ethylene-vinyl acetate copolymer can be further characterized as having ring and ball softening point of 180 to 390° F., inherent viscosity as 30° C. of 0.54 to 1.05.

The ethylene-vinyl acetate copolymers employed here are commercially available under the trademark Elvax[1]. Properties of some specific Elvax compounds, including those employed in the examples, are set out in Table I.

---
[1] E. I. du Pont de Nemours & Co.

TABLE I

| Grade | Melt index [1] | Percent vinyl acetate | Inherent viscosity [2] | Density, g./cc.[3] | Refractive index 25"D | Softening point [4] |
|---|---|---|---|---|---|---|
| Elvax 150 | 22–28 | 32–34 | 0.78 | 0.957 | 1.482 | 240 |
| Elvax 210 | 340–470 | 27–29 | 0.59 | 0.951 | 1.488 | 180 |
| Elvax 220 | 125–175 | 27–29 | 0.63 | 0.949 | 1.485 | 190 |
| Elvax 240 | 22–28 | 27–29 | 0.78 | 0.951 | 1.485 | 250 |
| Elvax 250 | 12–18 | 27–29 | 0.85 | 0 951 | 1.485 | 280 |
| Elvax 260 | 5–7 | 27–29 | 0.94 | 0.954 | 1.485 | 310 |
| Elvax 310 | 335–465 | 24–26 | 0.54 | 0.949 | 1.486 | 190 |
| Elvax 350 | 16–22 | 24–26 | 0.84 | 0.947 | 1.489 | 280 |
| Elvax 360 | 1.6–2.4 | 24–26 | 1.05 | 0.950 | 1.491 | 370 |
| Elvax 420 | 125–175 | 17–19 | 0.54 | 0.937 | 1.492 | 210 |
| Elvax 460 | 2.1–2.9 | 17–19 | 0.98 | 0.941 | 1.493 | 390 |

[1] G./10 min. (ASTM D 1238 modified).
[2] At 30° C. (0.25 g./100 ml. toluene).
[3] At 23° C. (ASTM D 1505).
[4] Ring and Ball, ° F. (ASTM E 28).

Aromatic hydrocarbon-aldehyde resins are well known in the art. Their preparation is described in many patents including U.S. Pat. No. 1,827,538 and U.S. Pat. No. 2,992,208, and in the literature, see for example Walker, Formaldehyde, 2nd Edition, Reinhold Publishing Company, New York, 1960, pages 342–345.

Typical feedstocks for the formolite reaction include aromatic hydrocarbon fractions boiling in the range of from about 200° F. to 950° F., derived from petroleum refinery streams such as cracked fractions, cycle streams, hydroformer bottoms, fuel oil, straight run distillates and pure aromatic fractions. The gas oil fraction from catalytic cracking, boiling in the range of from about 450° F. to about 650° F. and containing 15 to 50% aromatic hydrocarbons is a particularly preferred feedstock.

Suitable pure aromatic hydrocarbons include for example benzene, alkyl benzenes, naphthalene, alkylnaphthalene, hydrogenated naphthalenes or mixtures of such pure aromatic hydrocarbons. Some specific aromatic hydrocarbons are benzene, toluene, ethylbenzene, diethylbenzene, naphthalene, alpha-methylnaphthalene, beta-methylnaphthalene, ethylnaphthalene, Tetralin and the like.

Suitable aldehydes are formaldehyde and materials which yield formaldehyde under the conditions of the reaction such as Formalin, paraformaldehyde, trioxymethylene and trioxane. Of this group, formaldehyde and paraformaldehyde are preferred because of availability and handling ease. Other aldehydes such as acetaldehyde, propionaldehyde and butyraldehyde can be used. The alehyde is used in amounts ranging from 1 to 30 wt. percent based on the aromatic hydrocarbons in the charge.

Many catalysts have been used for the formolite reaction including $H_2SO_4$, HF, formic acid, phosphoric acid, $BF_3$, metal chlorides and other acid acting catalysts. It is preferred to use sulfuric acid or $BF_3$ in the presence of acetic acid. Acetic acid serves as a modifier for sulfuric acid or $BF_3$. Acetic acid appears to be the source of acetate groups sometimes found in the molecular structure of the formolite resin product.

In a typical run 226 pounds of catalytic gas oil having a boiling range of 448° F. to 572° F. and containing 47.3% aromatics (gel) and 14 pounds of paraformaldehyde were placed in a 50 gallon glass-lined reactor equipped with an agitator. The mixture was heated to a temperature in the range of 190° F. to 230° F.

Next, 18 pounds of 96 wt. percent sulfuric acid was slowly added to 55 pounds of glacial acetic acid with stirring and the acid mixture was slowly metered to the reactor with agitation.

The reaction mixture was stirred for about 30 minutes at a temperature ranging from 190° F. to 230° F. A closed system was used and the pressure slowly rose to about 32–33 p.s.i.g.

Heating was discontinued, the acid layer was removed by settling, and the reaction products were pumped hot to water washing facilities. The products were washed four times. Water was removed by settling and the reaction product was vacuum distilled. 30.7 pounds of hard resin were recovered. This represented a bottoms fraction boiling above about 500° F. at 1 mm. The material had a ring and ball melt point of 105° C. (220° F.). This resin and others similarly prepared were analyzed for acetate content and were found to contain from about .1 to about 1.0 acetate group per molceule of formolite resin. Analysis was obtained by saponification number and infrared spectra.

If the distillation of the product is carried out at 10 mm. and 330° C. (626° F.) then the resin is found to have no acetate content. The presence or absence of residual acetate groups in the formolite type resin is of no importance in the present invention.

Hard resins having a ring and ball softening point of 70 to 150° C., preferably 90 to 140° C., are suitable aromatic hydrocarbon-aldehyde components.

The formolite type resins employed in the compositions of the invention can be characterized by certain hexane solubility properties. The solubility characterization involves a room temperature (25° C.) hexane insoluble fraction, a cold (0° C.) hexane insoluble fraction and a cold hexane soluble fraction. Such characterizations were quite useful in compositions of an aromatic hydrocarbon-aldehyde resin and an ethylene-vinyl acetate copolymer since there were compatibility problems between the resin and copolymer depending on wt. percent of room temperature insoluble fraction in relation to wt. percent of vinyl acetate in the ethylene-vinyl acetate copolymer.

It has been found that with the addition of the high melting crystalline wax component the problem in regard to compatibility is abrogated and formolite type resins without regard to the hexane solubility characteristics thereof are compatible with ethylene-vinyl acetate copolymers without regard to the amount of vinyl acetate present therein to the extent that mixtures thereof according to the present invention are homogeneous mixtures which do not separate on standing hot.

The wax employed to achieve the good creep properties of the present invention and which is a component of the hot melt adhesive compositions of the invention is a high melting crystalline wax that is incompatible with the other components of the hot melt adhesives to the extent that macro-pockets of crystallinity are formed on cooling. It has been found that suitable waxes include micro-crystalline and paraffin waxes from petroleum, synthetic waxes and natural waxes having a melting point of at least 150° F. and more preferably at least 160° F. The melting points of such waxes are generally in the range of 150 to 225° F. and preferably in the range of 160 to 200° F.

Suitable synthetic waxes are those produced in the Fischer-Tropsch process. Other suitable synthetic waxes include the amines of hydrogenated tallow fatty acids, metaterphenyl and the ketones of long chain fatty acids such as behenone and the like.

Suitable natural waxes are carnauba, montan, ouricury, shellac, sugar cane (refined wax), raffia, esparto wax and the like.

In addition to having the proper melt point, the waxes employed in producing good creep properties of the instant hot melt adhesive compositions must be water insoluble. The wax component may be a single wax or a blend of the various suitable waxes.

The hot melt adhesive is prepared by mixing the ingredients at a temperature in the range of 200° to 400° F. Preferably the lowest temperature that will result in sufficient softening of all the ingredients is used. This prevents unnecessary oxidation of the compositions and is most economical. In the instant case, temperatures in the range of 225 to 325° F. are preferred. Usually the mixing is carried on at about 295° F.

Mixing may be carried out in any suitable manner. Satisfactory mixing is easily carried out in a heated sigma blade mixer. The mixing is continued until the adhesive composition is homogeneous.

For application to a surface, the adhesive is heated to a temperature of the range of 250 to 450° F. Generally, the lowest temperature that produces the viscosity desired and suitable for the particular application of the hot melt adhesive is employed.

The hot melt adhesives were screened by two simple tests.

The first test is the tear seal test. The sample is made on 50 pound kraft paper cut into ½ by 5½ inch strips. Each strip is coated on a single side for a length of one inch with a 1 mil. coating of hot melt adhesive. Then two 1 by ½ inch adhesive areas are placed together and the adhesive area heated with 2¾ pounds of pressure applied to remelt the hot melt adhesives and form a bond. In the instant case an ordinary electric hand iron was placed on top of the adhesive area and used to heat the adhesive to 250 to 450° F. The sample then consists of two layers of paper bonded together on internal surfaces over a 1 by ½ inch area at one end. The temperature of the heat sealing of the sample is adjusted so that all adhesives have approximately the same viscosity when sealed.

The test is made by securing the free end of one strip to a stationary mounting and securing the free end of the other strip to a pulling arm all of which is mounted in a variable temperature cabinet maintained at a constant temperature for each sample. When the pulling arm is activated, it pulls perpendicular to the plane of the bond at the rate of 4½ inches per minute.

A series of samples on a particular hot melt composition is run at 5° F. intervals upward until there is a failure of the bond in the adhesive. The temperature of the adhesive bond failure is recorded and the fiber tear is recorded as the next preceeding temperature reading. A particular sample is conditioned at the test temperature for 10 minutes prior to testing.

In the instant test a fiber tear seal of 130° F. is acceptable, preferably 140° F.

Some hot melt adhesive samples were also tested at $-10°$ F. in order to test for brittleness at severe low temperature service conditions the bond might be expected to encounter.

In this case duplicate samples are cooled to $-10°$ F. One sample is subjected to the tear seal test as described at $-10°$ F. and the other sample is struck a sharp blow and subjected to the test at $-10°$ F. Only if both samples exhibit a tear seal (i.e., failure of the bond in the substrate, kraft paper in this case) is a tear seal recorded.

The second test is the creep test. This test measures the flow characteristics of the hot melt adhesive under a predetermined load. The test is conducted in a constant temperature chamber maintained at 140° F. A pellet of the hot melt composition having a diameter and height of ½ inch is placed on platform in the chamber and a load of 25 pounds per square inch is applied for 24 hours. The percent deformation is determined by measurement of the change in the height of the pellet. A deformation of 10% is acceptable, preferably less than 5%.

The following examples were carried out by blending the compositions and testing as set out above. Each hot melt composition contains 1 weight percent of butylated hydroxytoluene (BHT) antioxidant. In each composition Elvax was employed as the ethylene-vinyl acetate copolymer. The properties of the various Elvax copolymers are set out in Table I.

TABLE II.—COMPOSITIONS

| Examples | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Hot melt adhesive composition: | | | | | | | | | | | | | | | | | | | | | |
| 1. Ethylene-vinyl copolymer: | | | | | | | | | | | | | | | | | | | | | |
| Type: Elvax | 150 | 150 | 150 | 150 | 150 | 260 | 260 | 260 | 260 | 260 | 260 | 260 | 350 | 360 | 360 | 360 | 460 | 260 | 260 | 260 | 260 |
| Parts by wt | 40 | 40 | 40 | 40 | 40 | 40 | 40 | 40 | 40 | 40 | 40 | 40 | 40 | 40 | 40 | 40 | 40 | 40 | 40 | 40 | 40 |
| 2. Aromatic hydrocarbon-formaldehyde resin [1]: | | | | | | | | | | | | | | | | | | | | | |
| Ring & Ball softening pt., °C | 115 | 130 | 115 | 130 | 130 | 115 | 130 | 130 | 130 | 105 | 130 | | 130 | 105 | 130 | | 130 | 106 | 130 | 106 | 106 |
| Parts by wt | 59 | 59 | 39 | 39 | 49 | 59 | 59 | 39 | 49 | 39 | 39 | | 39 | 39 | 39 | | 39 | 39 | 39 | 39 | 39 |
| 3. Wax: | | | | | | | | | | | | | | | | | | | | | |
| Type [2] | A | A | A | | | B | B | A | A | A | A | A | A | A | A | A | A | | C | D | E | F |
| °F. melting pt | 193 | 193 | 193 | | | 153 | 153 | 193 | 193 | 193 | 193 | 193 | 193 | 193 | 193 | | 189 | 195 | 185 |
| Parts by wt | 20 | 20 | 10 | | | 20 | 20 | 20 | 20 | 59 | 20 | 20 | 20 | 59 | 20 | | 20 | 20 | 20 | 20 |
| 4. Ring & Ball softening pt. of composition, °C | 90 | 94 | 93 | 94 | 94 | 110 | 118 | 88 | 97 | 95 | 98 | 96 | 100 | 98 | 100 | 104 | | | | | |

[1] 1 part by weight of the aromatic hydrocarbon-formaldehyde resin has been replaced with BHT anti-oxidant.
[2] Wax Types: A. microcrystalline—petroleum; B. paraffin—petroleum; C. Fischer-Tropsch—synthetic; D. carnauba—natural; E. diheneicosyl ketone (behenone); F. 18-pentatriacontanone (stearone).

TABLE III.—TESTS OF COMPOSITIONS FROM TABLE II

| Examples | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Test of paper samples: | | | | | | | | | | | | | | | | | | | | | |
| 1. Tear seal: | | | | | | | | | | | | | | | | | | | | | |
| Type of bond failure: | | | | | | | | | | | | | | | | | | | | | |
| Fiber, °F | 115 | 120 | 131 | 135 | 135 | 140 | 140 | 135 | 135 | 145 | 156 | 100 | 145 | 156 | 160 | 112 | 156 | 145 | 150 | 146 | 140 |
| Adhesive, °F | 120 | 125 | 135 | 140 | 141 | 145 | 145 | 140 | 140 | 150 | 161 | 108 | 151 | 159 | 165 | 115 | 161 | 150 | 155 | 150 | 146 |
| Type of failure at $-10°$ F.[1] | Fib | Fib | Fib | Fib | Fib | Fib | Fib | Fib | Adh | Fib | Fib | Fib | Fib | Fib | Fib | Fib | Fib | Fib | Fib | Fib | Fib |
| 2. Creep, percent deformation at 140° F | Melt | Melt | 9.0 | 9.2 | 20 | 20 | 20 | 5.5 | 13 | 2.7 | 2.5 | 1.7 | 2.8 | 2.0 | 1.6 | 0.9 | 1.4 | 2.7 | 3.2 | 1.8 | 3.3 |

[1] Fib=Fiber; Adh=Adhesive.

It can be seen from Examples 1-5 that the use of the high-melting crystalline waxes according to the teachings of the present invention will improve the quality of a rather effective hot melt adhesive. It is not readily apparent why a wax having a melting point below the ring and ball softening points of the other major constituents will improve properties that are a function of temperature. The improved results can be attributed to incompatibility and crystallinity of the high melting waxes and not to the high melting point alone. The incompatibility of these waxes with the ethylene-vinyl acetate-formolite blends on cooling produces small pockets of crystallinity (macropockets) in the bond which have high melting points and are sufficient even at the low concentration employed herein to give the creep resistance and tear properties required on corrugated paper board. Although the wax is incompatible on cooling, the hot melt system is blended as a homogeneous mixture which does not separate on standing hot. The hot melt composition can be cooled to solid form and subsequently remelted and it will still be homogeneous since the wax pockets are so small.

It can be seen from Examples 12 and 16 that the use of only a crystalline, high-melting wax with the ethylene-vinyl acetate copolymer will not produce satisfactory bonds.

Similarly, omission of the wax will not give a satisfactory bond since the creep properties are unacceptable.

The examples presented herein are intended to be merely illustrative and are not intended to limit the scope of the claims. Certain ranges of components have been specified and it is to be understood that those of skill in the art will be able to select the respective proportion from each range so as to produce compositions within the spirit and scope of the invention. The examples provide the guidelines to indicate to those of skill in the art the means and manner of component selection and compounding.

The invention claimed is:

1. A thermoplastic hot melt adhesive composition comprising a mixture of 35 to 60 parts by weight of an ethylene-vinyl acetate copolymer containing 17 to 30 weight percent vinyl acetate, 30 to 45 parts by weight of an aromatic hydrocarbon-aldehyde resin having a ring and ball softening point in the range of 70 to 150° C. and 10 to 25 parts by weight of a crystalline-wax having a melting point of at least 150° F. selected from the group consisting of petroleum wax selected from the group consisting of microcrystalline wax and paraffin wax; synthetic waxes selected from the group of Fischer-Tropsch wax, behenone; stearone; and natural waxes selected from carnauba and montan.

2. A thermoplastic hot melt adhesive according to claim 1 wherein the wax has a melting point in the range of 150 to 225° F.

3. A thermoplastic hot melt adhesive according to claim 2 wherein the aromatic hydrocarbon-aldehyde resin has a ring and ball softening point in the range of 90 to 140° C. and the wax has a melting point of at least 160° F.

4. A thermoplastic hot melt adhesive composition according to claim 3 wherein the wax has a melting point in the range of 160 to 200° F.

5. A thermoplastic hot melt adhesive composition according to claim 4 wherein the wax is a microcrystalline wax derived from petroleum.

6. A thermoplastic hot melt adhesive composition according to claim 4 wherein the wax is a synthetic wax.

7. A thermoplastic hot melt adhesive composition according to claim 6 wherein the synthetic wax is diheneicosyl ketone.

8. A thermoplastic hot melt adhesive composition according to claim 6 wherein the synthetic wax is 18-pentatriacontanone.

9. A thermoplastic hot melt adhesive composition according to claim 4 wherein the wax is a natural wax.

10. A thermoplastic hot melt adhesive composition according to claim 9 wherein the natural wax is carnauba wax.

11. A method of improving the creep properties of hot melt adhesives, said adhesives comprising 35 to 65 parts by weight of an aromatic hydrocarbon-aldehyde resin having a ring and ball softening point in the range of 70 to 150° C., comprising the steps of
  (a) mixing the ethylene-vinyl acetate copolymer with the aromatic hydrocarbon-aldehyde resin and
  (b) adding 10-25 parts by weight of the crystalline wax diheneicosyl ketone.

12. A method of improving the creep properties of hot melt adhesives, said adhesives comprising 35 to 65 parts by weight of an ethylene-vinyl acetate copolymer containing 17 to 30 weight percent vinyl acetate and 30 to 45 parts by weight of an aromatic hydrocarbon-aldehyde resin having a ring and ball softening point in the range of 70 to 150° C., comprising the steps of
  (a) mixing the ethylene-vinyl acetate copolymer with the aromatic hydrocarbon-aldehyde resin and
  (b) adding 10-25 parts by weight of the crystalline wax 18-pentatriacontanone.

References Cited
UNITED STATES PATENTS

| | | | |
|---|---|---|---|
| 3,474,055 | 10/1969 | Dooley | 260—28.5 AV |
| 3,419,641 | 12/1968 | Peterkin | 260—897 B |
| 3,220,966 | 11/1965 | Flanagan | 260—28.5 A |
| 3,448,178 | 6/1969 | Flanagan | 260—897 B |
| 3,505,261 | 4/1970 | Battersby | 260—28.5 AV |
| 3,262,996 | 7/1966 | Kurtz | 260—28 |
| 2,490,550 | 12/1949 | Sermattel | 260—285 AV |
| 3,175,986 | 3/1965 | Apikos | 260—285 AV |
| 3,245,931 | 4/1966 | Matthew | 260—285 AV |
| 3,218,373 | 11/1965 | Salyer | 260—285 AV |
| 3,125,545 | 3/1964 | Van Cleve | 260—897 C |
| 3,325,431 | 6/1967 | McManus | 260—28.5 AV |
| 3,419,641 | 12/1968 | Peterkin | 260—897 |

OTHER REFERENCES

Warth, "The Chemistry and Technology of Waxes," 2nd Ed., 1956, Reinhold Pub. Co., p. 638.

ALLAN LIEBERMAN, Primary Examiner

P. R. MICHL, Assistant Examiner

U.S. Cl. X.R.

260—28